United States Patent [19]

Shimoda

[11] Patent Number: 5,214,020

[45] Date of Patent: May 25, 1993

[54] BACKWASH TYPE PARTICULATE FILTER

[75] Inventor: Masatoshi Shimoda, Hino, Japan

[73] Assignee: Hino Jidosha Kogyo Kabushiki Kaisha, Tokyo, Japan

[21] Appl. No.: 726,822

[22] Filed: Jul. 8, 1991

[30] Foreign Application Priority Data

Jul. 10, 1990 [JP] Japan .................... 2-182467

[51] Int. Cl.$^5$ .............................. B01J 32/00
[52] U.S. Cl. .................... 502/439; 502/527; 423/215.5
[58] Field of Search .............. 502/439, 527; 423/215.5

[56] References Cited

U.S. PATENT DOCUMENTS

| | | | |
|---|---|---|---|
| 4,849,399 | 7/1989 | Joy et al. | 502/527 X |
| 4,902,487 | 2/1990 | Cooper et al. | 423/215.5 |
| 4,912,076 | 3/1990 | Mizrah et al. | 502/439 X |

Primary Examiner—W. J. Shine
Attorney, Agent, or Firm—Staas & Halsey

[57] ABSTRACT

The backwash type particulate filter according to the present invention is constituted by a gas permeable ceramic filter with a plurality of bores, the one ends of which open to gas inlet ports and the other ends of which open to gas outlet ports and the inner surfaces of the bores being used for filtration surfaces, and a NOx catalyst carried on the outer surface of the ceramic filter. Accordingly, the NOx catalyst is isolated from the influence of heat caused by burning the soot in the exhaust gas from a diesel engine collected on the filtration surfaces, thereby maintaining its catalytic function for a long time. The soot in the exhaust gas is effectively removed with the ceramic filter and the hazardous gas components in the exhaust gas with the NOx catalyst, respectively.

10 Claims, 1 Drawing Sheet

BACKWASH TYPE PARTICULATE FILTER

BACKGROUND OF THE INVENTION

1. Field of the Invention

This invention relates to a backwash type particulate filter for use in an exhaust system in a diesel engine.

2. Prior Art Statement

Recently, for trucks and buses ceramic filters which remove soot contained in exhaust gas from the diesel engines are under development. These ceramic filters tend to be repeatedly used by blowing in air instantaneously into the reverse direction with respect to the exhaust gas flow and blowing away the collected soot from the filtration surfaces.

These ceramic filters are formed to have a honeycomb structure and to carry a NOx catalyst on the filtration surfaces so that their soot collecting efficiencies are high. However, when the collected soot on the filtration surfaces is burned, the temperature of the filtration surfaces rises to about 1000° C. and thereby the NOx catalyst crystallizes due to the high temperature. As a result, it is rendered difficult for the catalyst to maintain its function.

SUMMARY OF THE INVENTION

The object and task of the present invention is to provide a backwash type particulate filter for use in a diesel engine which maintains its catalytic function for a long time, effectively reduces the soot and hazardous gas components contained in the exhaust gas and improves removing efficiency of the harzardous gas components.

For achieving the above object and task, a backwash type particulate filter according to the present invention includes a gas permeable ceramic filter body with a plurality of bores, the one ends thereof open to gas inlet ports and the other ends thereof open to gas outlet ports and the inner surfaces of the bores are used for filtration surfaces, and a NOx catalyst carried on the outer surface of the ceramic filter. Further, a backwash type particulate filter according to the present invention includes a gas permeable filter in which many cells are formed in a honeycomb structure, the both ends of those cells are selectively closed to form zigzag grid configurations, and the upstream side thereof with respect to the gas flow direction is used as filtration surfaces and the downstream side thereof as clean surfaces respectively, and an NOx catalyst carried by the ceramic filter body on the clean surfaces. Preferably the body comprises a cylindrically shaped block.

The present invention is directed to a filter for use in an exhaust system of a diesel engine. The filter comprises a gas permeable ceramic filter body which has an exhaust gas inlet zone, an exhaust gas outlet zone and a gas permeable ceramic wall-like structure disposed between said inlet zone and said outlet zone for filtering soot from exhaust gas as it flows through the filter from the inlet zone to the outlet zone. The gas permeable, ceramic wall-like structure has an upstream surface in communication with the inlet zone where the soot accumulates during operation. The gas permeable ceramic wall-like structure also has a downstream surface in communication with the outlet zone. In accordance with the invention, an NOx catalyst is disposed on the downstream surface of the gas permeable, ceramic wall-like structure.

The backwash type particulate filter according to the present invention avoids the influence of heat on the NOx catalyst caused by burning the soot in the exhaust gas from the diesel engine collected on the filtration surfaces, maintains its catalytic function for a long time and removes effectively the soot in the exhaust gas with the ceramic filter and the harzardous gas components in the exhaust gas with the NOx catalyst respectively.

DESCRIPTION OF THE EMBODIMENTS

Hereinafter, specific embodiments of backwash type particulate filter according to the present invention are explained with reference to the drawings.

Figure 1:
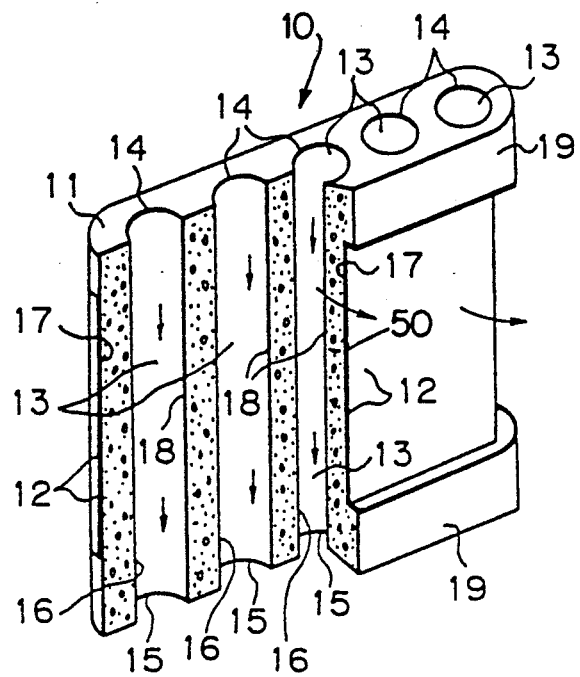
FIG. 1 is a perspective view showing partly in cross section one embodiment of a backwash type particulate filter according to the present invention which is applied to an exhaust gas purification device for a diesel engine.

FIG. 1 shows an embodiment of a backwash type particulate filter 10 according to the present invention which is applied to an exhaust gas purification device for a diesel engine mounted on a truck.

The backwash type particulate filter 10 was produced in such a structure that includes a gas permeable ceramic filter 11 with a plurality of bores 13, the one ends thereof open to gas inlet ports 14 and the other ends thereof open to gas outlet ports 14 and the other ends thereof open bores 13 are used for filtration surfaces 18 and a NOx catalyst 12 carried on the outer surface 17 of the ceramic filter 11.

As can be seen viewing FIG. 1, a gas permeable, ceramic, wall-like structure 50 is presented between each filtration surface 18 and the outer surface 17.

The ceramic filter 11 was formed from ceramic powder with molds, after taken out from the molds and dried, the ceramic filter was fired.

The ceramic filter 11 was configured into a plate shaped block, on the both ends of one outer surface 17, which constitutes one plate surface of the plate shaped block, step shaped spacers 19 were integrally formed which permits formation of a space between adjacent ceramic filters 11 when a plurality of the ceramic filters 11 are stacked, such that the stacked ceramic filters enable the exhaust gas flow in the bores 13 from the gas inlet ports 14 to flow out from the outer surfaces 17, in that from the both plate surfaces of the plate shaped block.

Cu-zeolite was used as the NOx catalyst 12 which catalytically decomposes harzardous components contained in the exhaust gas from the diesel engine represented by nitrogen oxides (NOx).

Now, the operation of the backwash type particulate filter 10 for reducing the soot and NOx contained in the exhaust gas from the diesel engine is explained.

When the diesel engine is running, the exhaust gas flows into the bores 13 via the gas inlet ports 14.

In the course when the exhaust gas passes through the gas permeable ceramic filter 11, the soot contained in the exhaust gas is collected on the filtration surfaces 18 and the NOx contained in the exhaust gas is decomposed by the action on the Cu-zeolite 12, thereby the exhaust gas is cleaned. Of course, the soot collected on the filtration surfaces 18 is blown away into a soot sump (not shown) by blowing in air momentarily in the reverse direction to the exhaust gas flow and is burned there.

In this instant, the Cu-zeolite 12 is carried on the outer surfaces 17 of the ceramic filter 11 which are remove from the filtration surfaces 18 in the ceramic filter 11, the Cu-zeolite 12 is isolated from the influence of heat due to the burning of the soot, thereby its catalytic property is maintained for a long time, as a result, the NOx contained in the exhaust gas is effectively decomposed by the same Cu-zeolite catalyst 12 for a long time.

Figure 2:
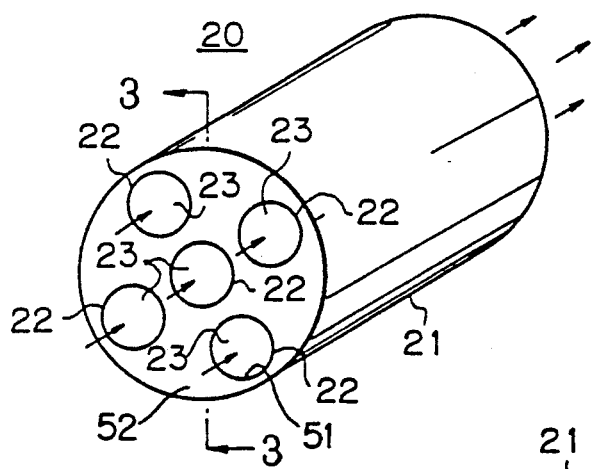
FIG. 2 is a perspective view of another embodiment of a backwash type particulate filter according to the present invention.
Figure 3:
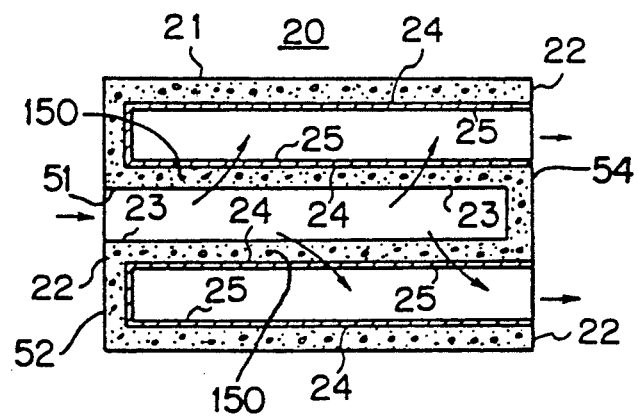
FIG. 3 is the cross sectional view taken along the line 3—3 in FIG. 2.

FIGS. 2 and 3 show another embodiment of a backwash type particulate filter 20 according to the present invention which is also applied to an exhaust gas purification device for a diesel engine.

This backwash type particulate filter 20 was produced in such a structure that includes a gas permeable ceramic filter 21 in which a multiplicity of cells 22 are formed in a honeycomb structure, the both ends of these cells 22 are selectively closed to form zigzag grid confugirations and the upstream side thereof with respect to the gas flow direction is used as filtration surfaces 23 and downstream side thereof as clean surfaces 24, and a NOx catalyst 25 carried by the ceramic filter 21 on the clean surfaces 24.

As can be seen in FIG. 3, a ceramic, gas permeable, wall-like structure 150 is presented between each filtration surface 23 and the corresponding clean surface 24. Also as can be seen in FIG. 3, the filter 21 is elongated and the cells 22 are in the form of transversely spaced and parallel bores which extend longitudinally of the filter 21.

The ceramic filter 11 was formed from ceramic powder powder with molds, after taken out from the molds and dried, the ceramic filter was fired.

As the NOx catalyst 25, Cu-zeolite was used which enables decomposition of the NOx contained in the exhaust gas from the diesel engine.

In the backwash type particulate filter produced with such structure, the exhaust gas of the diesel engine flows into cells 22 with openings 51 which open at the upstream end 52 of the filter with respect to the gas flow direction and in the course of travelling into cells 22 adjacent thereto and with openings which open at the downstream end 54 of the filter with respect to the gas flow direction, the soot contained in the exhaust gas is collected at the filtration surfaces 23 of the cells 22, and the NOx contained in the exhaust gas is decomposed by the action of the Cu-zeolite.

As described above, the exhaust gas is cleaned during the passage through the particulate filter 20, and is discharged into air. Of course, in this backwash type particulate filter 20 the soot collected on the filtration surfaces 23 is also blown away into a soot sump by momentally blowing air into openings of the cells 22 which open at the downstream side with respect to the gas flow direction and is burned there.

As will be understood from the above description a backwash type particulate filter according to the present invention includes a gas permeable ceramic filter with a plurality of bores, the one ends thereof open to gas inlet ports and the other ends thereof open to gas outlet ports and the inner surfaces of the bores are used for filtration surfaces, and an NOx catalyst carried on the outer surface of the ceramic filter. Further a backwash type particulate filter according to the present invention includes a gas permeable ceramic filter in which many cells are formed in a honeycomb structure, the both ends of those cells are selectively closed to form zigzag grid configurations, and the upstream side thereof with respect to the gas flow direction is used as filtration surfaces and the downstream side thereof as clean surfaces respectively, and an NOx catalyst carried by the ceramic filter on the clean surfaces. Accordingly, with the backwash type particulate filter according to the present invention, the influence of heat on the NOx catalyst caused by burning the soot in the exhaust gas from the diesel engine collected on the filtration surfaces is avoided, its catalytic function is maintained for a long time, the nitrogen oxides contained in the exhaust gas are effectively decomposed by the same catalyst for a long time, and the soot contained in the exhaust gas is collected on the filtration surfaces thereby the soot and harzardous components contained in the exhaust gas are effectively reduced, in particular the removing efficiency of the harzardous components is improved, which are very useful and practicable for a vehicle mounting a diesel engine.

As set forth hereinabove, it will be apparent from the description of the embodiments of the present invention with reference to the drawings that persons having ordinary skill in the art pertaining the present invention can easily embody several modifications of the present invention which contain indispensable elements for achieving the tasks of the present invention and realizing the present invention, relate to the technical essence of the present invention which is the nature of the present invention, and are objectively recognized such is inherent.

What is claimed is:

1. A filter for use in an exhaust system of a diesel engine comprising a gas permeable ceramic filter body having a plurality of bores, the one ends of which open to gas inlet ports and the other ends of which open to gas outlet ports and the inner surfaces of the bores being used for filtration surfaces, and a NOx catalyst carried on the outer surface of said ceramic filter body.

2. A filter according to claim 1 wherein said ceramic filter body is formed into a plate shaped block.

3. A filter according to claim 2 wherein said plate shaped block is provided with a pair of stepped spacers at the both ends with respect to the exhaust gas flow direction on one of the plate surfaces of said plate shaped block.

4. A filter for use in an exhaust system of a diesel engine comprising a gas permeable ceramic filter body in which many cells are formed in a honeycomb structure, the both ends of those cells are selectively closed to form zigzag grid configurations, and the upstream side thereof with respect to the gas flow direction is used as filtration surfaces and the downstream side thereof as clean surfaces respectively, and a NOx catalyst carried by said ceramic filter body on the clean surfaces.

5. A filter according to claim 4 wherein said ceramic filter body comprises a cylindrically shaped block.

6. A filter for use in an exhaust system of a diesel engine, said filter comprising:
   a gas permeable ceramic filter body, said body having an exhaust gas inlet zone, an exhaust gas outlet zone and a gas permeable, ceramic wall-like structure disposed between said inlet zone and said outlet zone for filtering soot from exhaust gas as it flows through the wall-like structure from said inlet zone to said outlet zone, said gas permeable, ceramic wall-like structure having an upstream surface in communication with said inlet zone where said soot accumulates during operation, and a downstream surface in communication with said outlet zone; and Nox catalyst disposed on said downstream surface.

7. A filter as set forth in claim 6, wherein said inlet zone comprises an elongated inlet bore in said body, said inlet bore having an open inlet end portion for receiving said exhaust gas.

8. A filter as set forth in claim 7, wherein said body is elongated and has a pair of spaced ends, said outlet zone comprising an elongated outlet bore in said body and having an open end portion disposed at one end of the body, said inlet end portion being disposed at the other end of the body, said bores being transversely spaced and parallel to one another so as to present said wall-like structure therebetween.

9. A filter as set forth in claim 8, wherein said body comprises a cylindrically shaped block.

10. A filter as set forth in claim 9, wherein said block has a round cross-sectional configuration.

* * * * *

UNITED STATES PATENT AND TRADEMARK OFFICE
CERTIFICATE OF CORRECTION

PATENT NO. : 5,214,020
DATED : May 25, 1993
INVENTOR(S) : MASATOSHI SHIMODA

It is certified that error appears in the above-identified patent and that said Letters Patent is hereby corrected as shown below.

Column 1, line 24, delete "rendered".

Column 2, lines 34-35, "14" should be --15--; "other ends thereof open bores" should be --inner surfaces 16 of the bores--.

Column 3, line 22, "configirations" should be --configurations--;

line 35, "11" should be --21--; after "was" insert --likely--;

line 36, delete "powder".

Column 5, line 8, "Nox" should be --an NOx--.

Signed and Sealed this

Twenty-second Day of February, 1994

Attest:

BRUCE LEHMAN

*Attesting Officer*    *Commissioner of Patents and Trademarks*